United States Patent
Caldenhoven et al.

(10) Patent No.: US 9,420,470 B2
(45) Date of Patent: Aug. 16, 2016

(54) APPLICATION AWARE COMMUNICATION SYSTEM

(71) Applicants: Jürgen Caldenhoven, Düsseldorf (DE); Peter Wild, Krefeld (DE); Yang Lu, Düsseldorf (DE)

(72) Inventors: Jürgen Caldenhoven, Düsseldorf (DE); Peter Wild, Krefeld (DE); Yang Lu, Düsseldorf (DE)

(73) Assignee: Vodafone Holding GmbH (DE)

( * ) Notice: Subject to any disclaimer, the term of this patent is extended or adjusted under 35 U.S.C. 154(b) by 0 days.

(21) Appl. No.: 14/670,046

(22) Filed: Mar. 26, 2015

(65) Prior Publication Data

US 2015/0281967 A1 Oct. 1, 2015

(30) Foreign Application Priority Data

Mar. 28, 2014 (EP) .................................... 14162457

(51) Int. Cl.
*H04M 1/66* (2006.01)
*H04W 12/08* (2009.01)
*H04W 72/08* (2009.01)
*H04W 76/02* (2009.01)

(52) U.S. Cl.
CPC ............ *H04W 12/08* (2013.01); *H04W 72/085* (2013.01); *H04W 76/022* (2013.01)

(58) Field of Classification Search
CPC .. H04W 12/06; H04W 72/04; H04M 1/72519
USPC ...................... 455/411, 450, 550.1
See application file for complete search history.

(56) References Cited

U.S. PATENT DOCUMENTS

| | | | | |
|---|---|---|---|---|
| 2006/0046752 A1* | 3/2006 | Kalavade | ................ | H04W 4/12 455/466 |
| 2008/0076392 A1* | 3/2008 | Khetawat | .............. | H04L 63/123 455/411 |
| 2008/0076425 A1* | 3/2008 | Khetawat | .............. | H04W 88/12 455/436 |
| 2008/0214220 A1* | 9/2008 | Beziot | ................... | H04W 72/10 455/512 |
| 2013/0073400 A1* | 3/2013 | Heath | .................... | G06Q 30/02 705/14.73 |
| 2013/0259020 A1* | 10/2013 | Ullah | ........................ | G01S 5/02 370/338 |

* cited by examiner

*Primary Examiner* — Danh Le
(74) *Attorney, Agent, or Firm* — Tarolli, Sundheim, Covell & Tummino LLP (57) ABSTRACT

A device and method is provided of administrating an application within a bearer of a mobile communication network. An example method comprises activating by means of a mobile device an application requiring access to the mobile communication network, identifying the application by means of an application identification unit, allocating an application index to the application by means of the application identification unit based on the identification of the application, and coupling the application index to an access request related to the application by means of the application identification unit, such that managing network resources based on the coupled application index is enabled. Devices, methods, network components and communication systems are provided to couple an application index in a flexible way to an application running on a mobile device in order to enable management of access requests requiring the same quality of service (QoS).

10 Claims, 4 Drawing Sheets

APPLICATION AWARE COMMUNICATION SYSTEM

RELATED APPLICATIONS

The present invention claims priority from EP14162457.7, filed 28 Mar. 2014, the entirety of which is incorporated herein by reference.

FIELD OF THE INVENTION

The invention relates to a method of administrating applications within a bearer of a mobile communication network. The invention further relates to a mobile device or network component being adapted to perform the method. The invention finally relates to communication systems being adapted to perform the method.

BACKGROUND OF THE INVENTION

The Non-Access-Stratum (NAS) is a functional protocol layer in the UMTS and LTE wireless telecom protocol stacks placed between the core network (GPRS and EPC) and mobile device. The NAS layer is used to manage the establishment of communication sessions and for maintaining continuous communications with the mobile devices as it moves. Except for the 3GPP defined Traffic Classes, the NAS layer is not cognizant of the specific applications requested and run by the mobile device. The LTE/EPC brought about the default bearer context concept which enables the 4G capable mobile devices immediately obtaining an IP address after attaching/registering to the LTE/EPC mobile network. Although this concept speeds up the packet call setup, the default bearer context is assigned to all best-effort packet calls and does not provide quality of service (QoS) guarantees. Furthermore, the default bearer context assigned to all mobile devices within one operator's network generally uses the same single QoS Class Identifier (QCI) which leads to an indistinguishable packets admission control and forwarding treatment at the radio access bearer level (e.g. packet data scheduling weights, link layer configurations) for all best-effort packet calls within the mobile communication network. This causes the mobile operators being unable to separate and classify the different packet calls/applications using the default bearer context, and to deploy diverse packet calls handling policies, particularly when the network gets congested, because the NAS is unaware of the applications. Control and prioritization of communication traffic is thus difficult.

SUMMARY OF THE INVENTION

It's thus an object of the present invention to enable an application sensitive control of network traffic within a bearer especially the default bearer.

According to a first aspect a method of administrating an application within a bearer of a mobile communication network is provided, the method comprises the steps of:
- Activating by means of a mobile device an application requiring access to the mobile communication network;
- Identifying the application by means of an application identification unit;
- Allocating an application index to the application by means of the application identification unit based on the identification of the application;
- Coupling the application index to an access request related to the application by means of the application identification unit such that managing network resources based on the coupled application index is enabled.

The bearer is assigned by the network. The mobile device has to find out whether or not there is a proper bearer to carry out the application based on the quality of service (QoS) requested by the application. If a proper bearer is found, the device attempts to use it and hence requests the network to establish the radio and core network resources according to the bearer context. If no proper bearer is found, the device requests the network to establish a new bearer and the corresponding radio and core network resources by providing the related quality of service requested by the application. In both cases the device has to send a message (NAS message, extended service request or bearer resource allocation request) to the core network. In general the default bearer is used because most applications do not require a special QoS like, for example, a defined minimum bandwidth. The latter happens despite of the fact that some applications like, for example, Youtube, consume substantial network resources but do not require special QoS. Such applications share the restricted default bearer with less demanding applications like mail applications.

For instance, when a huge number of customers stand in the morning/evening at a railways station and start with surfing the internet with Youtube, Social networks (like facebook or google+), News Reading and Interactive Gaming etc, it is desirable for the mobile operators to differentiate such packet calls and implement different packet calls handling priority in order to mitigate the network congestions and satisfy the customers as much as possible.

It is thus proposed that an application identification unit identifies an application started by a user of a mobile device and allocates an application index to the application. The application index may be any information that can be used to identify the application. The application index may, for example, be a number starting, for example, reflecting the network resources which are on average required to run the application. An application index of "one" may be allocated to application usually requiring only few network resources (e.g. reading Emails). The more network resources are usually needed to run the respective application the higher is the allocated application index. Social networking like facebook, Google+ and the like may be allocated to application index "two". Online chatting e.g. by means of Skype may be allocated to application index "three" etc. The application index is further coupled to an access request to the mobile communication network which is initiated by means of the mobile device after starting the application. Coupling means, for example, that the application index may be added to the access request. Alternatively, the application index and the corresponding access request may be marked such that it can be determined that a certain application index belongs to a defined access request. This may, for example, enable the possibility that the access request and the corresponding application index may be transmitted in different messages from the mobile device to the mobile communication network if, for example, the mobile device identifies, allocates and couples the application index. The application identification unit may in this case be comprised by the mobile device. The application index may thus be coupled to the access request prior submitting the access request from the mobile device to the mobile communication network. Coupling means in general that the relation between the access request and the application index is identifiable by means of the network.

In an alternative approach the application identification unit may be comprised by a network component of the mobile communication network. The application index may in this case be coupled to the access request after submitting the access request to the communication network.

The access request and the coupled application index may be submitted to an application administration unit. The application administration unit may be adapted to assign the coupled application index to the respective access request. The application administration unit may be implemented in any network unit which is suitable to enable management of network resources based on the assigned application index to the activated application. The application administration unit may be a dedicated hardware device or software code running on a hardware device of a network unit like an evolved Node B (eNB), a Radio Network Controller (RNC) or a unit of the core network of an LTE mobile communication network like the Management Mobility Entity (MME).

Managing network resources may comprise assignment of a priority to the access request based on the application index. The application index may, for example be used to prioritize applications requiring only few network resources like Email applications. The latter may enable that more users can access the mobile communication network by means of, for example, the default bearer at one moment in time. Alternatively, it may also be possible that an application like Youtube may be prioritized by means of the application index, which requires substantial network resources. Services offering such application could be offered a prioritized access by means of the application index assigned to the respective application.

The application index may further enable to analyze and control access to the mobile communication network within the bearer especially the default bearer. The application indices of access requests received within a predetermined time period may be analyzed by means of a network unit. The network load may be estimated based on the analysis. The application index enables an estimation of the network load based on the average network load of an application couple to an application index and the number of access requests with the application index. The application index should in this case be adapted to the characteristics of the application with respect to the network load in order to enable a reliable estimation of the network load.

The estimated network load may be used to manage access to the mobile communication network. Certain applications may, for example, be blocked if the network traffic exceeds a defined threshold value. The predetermined time period may thus be short in order to enable short reaction times. The predetermined time period may be 5 minutes, 1 minute, 30 seconds or less than 10 seconds. The predetermined time period may be adapted in the course of a day and/or week. An adaptive control of the network traffic within a bearer especially the default bearer may thus be enabled.

The user and/or the application service provider may be informed if certain applications are blocked in view of the capacity of the bearer used for the respective applications. An application service provider may be offered the opportunity to change QoS of the respective application during a defined time period such that the application may use a dedicated bearer instead of the default bearer.

Alternatively or in addition a capacity of the bearer especially the default bearer may be adapted in accordance with the determined or estimated network load. The capacity of the, for example, default bearer may be adapted in the course of the day and/or week. The adaption of the capacity may depend on the application service provider. The application service provider may be offered additional network resources within the, for example, default bearer in order to enable an acceptable performance of the respective application.

The mobile device or a network component may identify the application may be by means of an Access Point Name and/or an Internet Protocol Address being related to the application.

According to a further aspect a mobile device is proposed. The mobile device comprises an application identification unit. The application identification unit is adapted to identify an application which is activated by means of a user of the mobile device and running on the mobile device. The application identification unit may be further adapted to allocate an application index to the application based on the identification of the application. The application identification unit may be further adapted to couple the application index to an access request related to the activated application such that managing of network resources based on the coupled application index is enabled. An allocation list may in this case be stored in a memory device of the mobile device. The application identification unit may be a dedicated hardware device or software code running on a processor of the mobile device. The application index may be coupled to access requests requesting the same QoS such that applications using the same bearer especially the dedicated bearer can be differentiated.

According to a further aspect a network component of a mobile communication network comprising an application identification unit is proposed. The network component may be adapted to receive an access request being related to an application activated on a mobile device. The application identification unit may be adapted to identify the application. The application identification unit may be further adapted to allocate an application index to the application based on the identification of the application. The application identification unit may be further adapted to couple the application index to an access request related to the activated application such that managing network resources based on the coupled application index is enabled. An allocation list may in this case be stored in a memory device of the network component. The application identification unit may be a dedicated hardware device or software code running on a processor of the network component. The application index may be coupled to access requests requesting the same QoS such that applications using the same bearer especially the dedicated bearer can be differentiated.

According to a further aspect an application administration unit being adapted to receive an access request being related to an application activated on a mobile device is proposed. The access request may be coupled to an application index. The application administration unit may be further adapted to assign the application index to the access request using the coupling between the access request and the application index. The application administration unit may be further adapted to manage network resources based on the assigned application index.

According to a further aspect a first communication system comprising a mobile device with the application identification unit and the application administration unit as described above.

According to a further aspect a second communication system comprising the network component and the application administration unit as described above.

The application identification unit may be located in the mobile device or in the network component. It may also be possible that there are mobile devices with or without application identification unit in one mobile communication network. The network (e.g. the network component) may in this case be adapted to check whether an application index is coupled to an access request. The network component may be adapted to identify the application, allocate the respective application index and couple the application index to the access request if no application index is coupled to the access request by means of the mobile device.

The network component may in addition be adapted to check whether the allocation of the application index by means of the mobile device is in accordance with a current allocation policy within the mobile communication network. The network component or any other suitable network unit may be further adapted to synchronize the application identification unit of one or more mobile device according to the current allocation policy.

The network component or any other suitable network unit may be further adapted to block a mobile device if continued deviation between the identification, allocation and coupling of application indices by means of the mobile device and the current allocation policy is determined. Continued deviation may, for example, be detected if the mobile device does not apply an allocation policy after receiving a synchronization message comprising a list of applications and respective application indices. The network system may in this case be enabled to detect and suppress misuse of application indices coupled to access requests by means of mobile devices.

The first or second communication system may be adapted to determine a network load being related to the application, and the first or second communication system may be further adapted to adapt the application index of a specific application based on the determined network load.

A network unit may, for example, be arranged in a way that an average network load caused by means of an application can be determined. An application index may be allocated to the respective application or an application index may be adapted if a significant change of the average network load caused by the respective application is determined. The first and second communication system may therefore be able to determine changes of the characteristics of applications and to adapt the allocation between application index and application accordingly.

It shall be understood that the mobile device of claim 10, the network component of claim 11 and the method of claim 1 have if applicable similar and/or identical embodiments, in particular, as defined in the dependent claims.

The invention further relates to a computer program product. The computer program product comprising code means which can be saved on one or more memory device of a mobile device and/or a network unit. And the code means are arranged such that the method according to any one of the claims 1 to 9 can be executed by means of one or more processors of the mobile device and/or the network unit.

It shall be understood that a preferred embodiment of the invention can also be any combination of the dependent claims with the respective independent claim.

Further advantageous embodiments are defined below.

BRIEF DESCRIPTION OF THE DRAWINGS

These and other aspects of the invention will be apparent from and elucidated with reference to the embodiments described hereinafter.

The invention will now be described, by way of example, based on embodiments with reference to the accompanying drawings.

In the drawings.

DETAILED DESCRIPTION OF EMBODIMENTS

Figure 1:
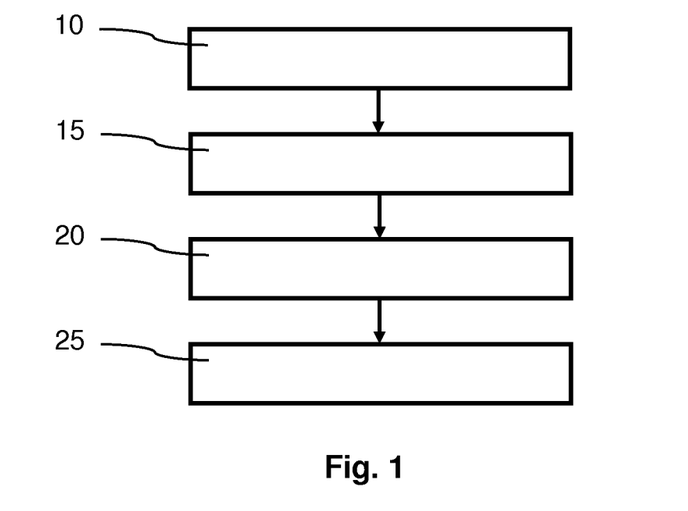
FIG. 1 shows a principal sketch of a method according to a first embodiment

Various embodiments of the invention will now be described by means of the Figures. FIG. 1 shows a principal sketch of a method according to a first embodiment. An application is activated or started by means of a user a mobile device 60 in step 10. The application is identified by means of an application identification unit 211 which is a software running on the processor of the mobile device 60 in step 15. The identification may be based on the Access Point Name and/or IP address of the respective service provider. An application index is allocated to the identified application by means of the application identification unit 211 in step 20. The allocation may be based on a list provided by the mobile communication network. An example of such a list is given in table 1 below.

TABLE 1

| Index | Application |
|---|---|
| 1 | Reading Emails (blackberry etc) |
| 2 | Social Networking (Facebook, Google+ etc) |
| 3 | Online chat (Skype etc) |
| 4 | News Reading |
| 5 | Interactive gaming |
| ... | ... |
| N | Youtube |

The value of the application index corresponds in this case to an average network load caused by the respective application. The higher the application index is the higher is the average network load. The application index is finally coupled to an access request of the mobile device 60 in step 25 by means of the application identification unit 211. The access request is initiated after starting the application. The method especially enables to differentiate applications requiring the same QoS. The applications are thus using the same bearer especially the default bearer 150.

Figure 2:
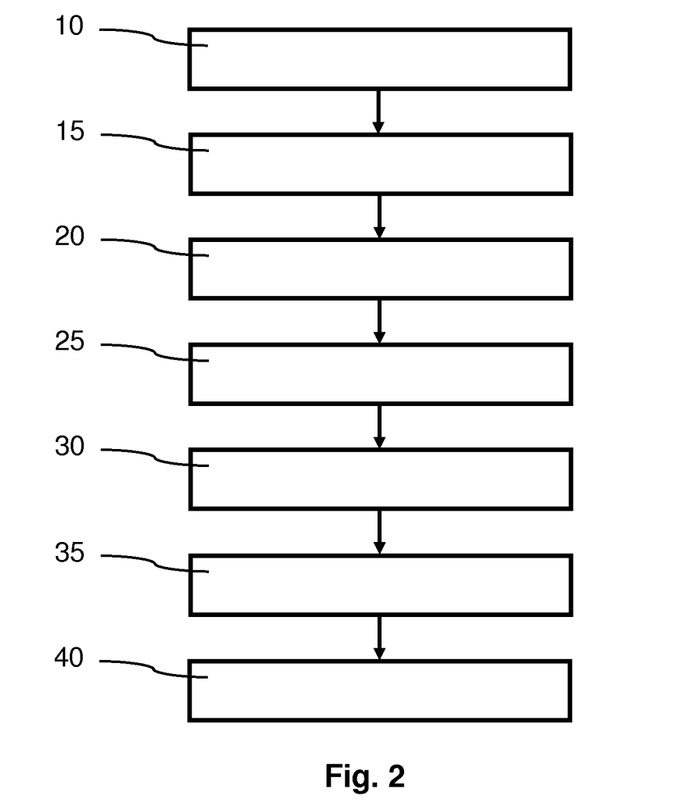
FIG. 2 shows a principal sketch of a method according to a second embodiment

FIG. 2 shows a principal sketch of a method according to a second embodiment. An application is activated or started by means of a user of a mobile device 60 in step 10. A corresponding access request is generated and submitted to a network component 500 which may be the Management Mobility Entity (MME) 80. The MME comprises an application identification unit 411 which comprises in this case a dedicated processor and a corresponding memory device. The application identification unit 411 is adapted to identify the application by means of the Access Point Name and/or IP address of the respective service provider in step 15. The application index is allocated to the access request in step 20 and coupled to the access request in step 25. The access request and coupled application index is submitted to application administration unit 400 which may be also be integrated in network component 500 in step 30. The application administration unit 400 assigns in step 35 the application index to access request. Network resources can be managed in step 40 after assigning the application index to the access request within, for example, the default bearer used for the respective application. An access request may, for example, be prioritized or blocked by means of the application administration unit 400 based on the assigned application index.

The application identification unit 411 and application administration unit 400 may in an alternative approach be software code running on the same processor and sharing the same memory resources within network component 500. The steps of identifying, allocating, coupling, submitting and assigning the application index may in this case merge. Submitting may, for example, be the handover of data within or to the processor.

Figure 3:
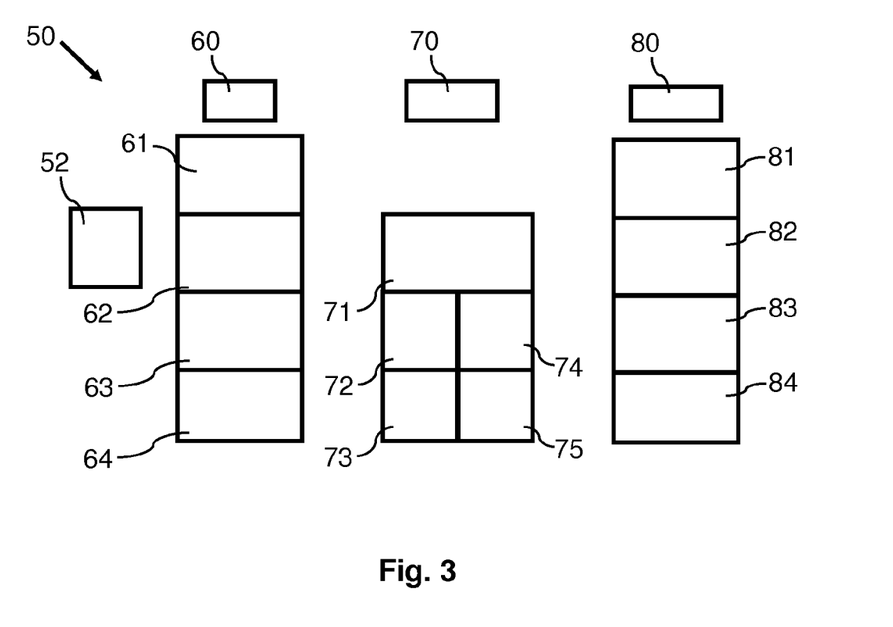
FIG. 3 shows a principal sketch of the signaling plane

FIG. 3 shows a principal sketch of a signaling plane 50 of a Long Term Evolution (LTE) mobile communication network. The signaling plane as depicted in FIG. 3 comprises the mobile device 60, the eNodeB (eNB) 70 and the MME 80. On the level of the mobile device 60 the Non Access Stratum (NAS) 52, the EPS Mobility management (EMM) and EPS Session Management (ESM) ESM/EMM 62, the application layer 61 and Radio/L2 63 and Radio/L1 64 are shown. The NAS 52, ESM/EMM 62 provide the protocols to prepare communication with eNB 70 via the physical interfaces Radio/L2 63 and Radio/L1 64. The eNB 70 comprises corresponding physical interfaces Radio/L2 72 and Radio/L1 71 and corresponding communication protocols S1AP/SCTP 74 and IP/L2/L1 75 for communicating with MME 80. The interaction between the physical interfaces to the mobile device and the corresponding communication protocols is controlled by means of eNB Service 71. MME 80 comprises corresponding components Applications 81, ESM/EMM 82 S1AP/SCTP 83 and IP/L2/L1 85 which are adapted to control the communication between mobile device 60 and the core network.

MME 80 is involved in the bearer activation/deactivation process and is also responsible for choosing the Service Gateway (SGW) for a mobile device 60 at the initial attach and at time of intra-LTE handover involving core network node relocation. It is responsible for authenticating the user (by interacting with the HSS). The Non Access Stratum (NAS) signaling terminates at the MME 80 such that MME 80 may be the preferred network component or unit to implement application identification unit 411 and application administration unit 400. MME 80 is also responsible for generation and allocation of temporary identities to mobile devices 60. It checks the authorization of the mobile device 60 to camp on the service provider's Public Land Mobile Network (PLMN) and enforces mobile device 60 roaming restrictions. The MME 80 is the termination point in the network for ciphering/integrity protection for NAS signaling and handles the security key management.

Figure 4:
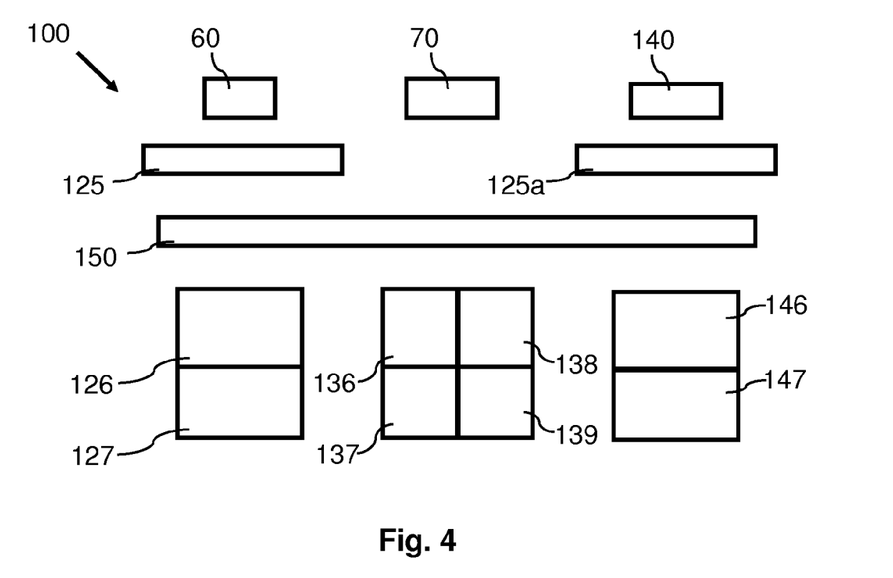
FIG. 4 shows a principal sketch of the user plane

FIG. 4 shows a principal sketch of the user plane 100 of a Long Term Evolution (LTE) mobile communication network. Communication between the mobile device 60 via eNB 70 to Service Gateway (SGW) and Packet Data Network Gateway (PGW) S/PGW 140 are transmitted, for example, via default bearer 150 which is permanently available. Most Applications 125 running on mobile device 60 use default bearer 150. Access requests are transmitted which are related to corresponding Applications 125*a* in S/PGW 140. The Packet Data Convergence Protocol (PDCP) is implemented in the mobile device 60 (PDCP 126) and eNB 70 (PDCP 126). It is part of the LTE air interface control and user planes. One of the main functions of PDCP 126, 136 is, for example, the transfer of user data. Radio Layer 1 and 2 Radio/L1/L2 127, 137 provide the physical interface for exchanging data between mobile device 60 and eNB 70. GTP-U/UDP 138, 136 are used to transfer data within the core network and between the RAN and the core network. IPL2/L1 139, 147 carry IP data of the user. Identification of applications using default bearer 150 either by means of mobile device 60 or a network component 500 like MME 80 enables marking of the corresponding access request by means of the application index. The marking enables the network, for example, via MME 80 to control data traffic within one, especially the dedicated bearer 150 by means of an application administration unit which may be located in MME 80 or any other network entity which can be used for this purpose.

Figure 5:
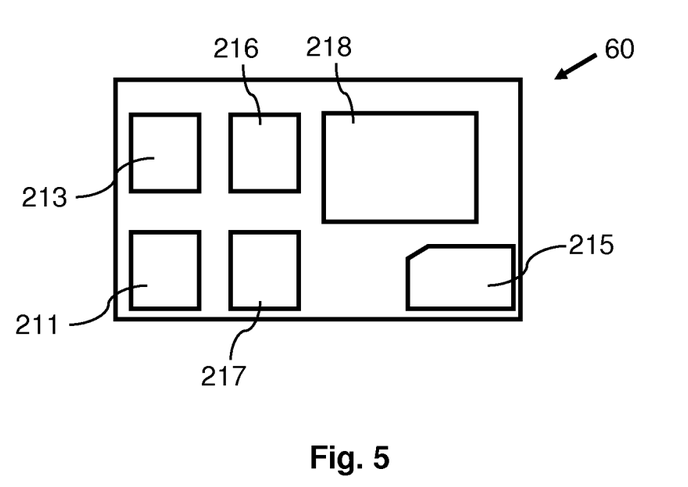
FIG. 5 shows a mobile device

FIG. 5 shows a mobile device 60. The mobile device 60 comprises a security module 215 like a Subscriber Identity Module (SIM), a computing unit 217 like one or more processors, a memory unit 213 like RAM, memory cards or the like an acoustic unit 216 which may comprise speakers and microphones, a display unit 218 for displaying information and in this case to input data via a touch screen. Mobile device 60 further comprises an application identification unit 211. Application identification unit 211 is software code running on the processor of mobile device 60. The application identification unit 211 identifies an application started by a user of the mobile device 60 by touching a respective icon on the touch screen of mobile device 60. Application identification unit 211 further allocates an application index to the application. The allocated application index is further coupled to an access request to the mobile communication network by means of the application identification unit 211 which is submitted to eNB 70 by means of the mobile device 60 after starting the application.

Figure 6:
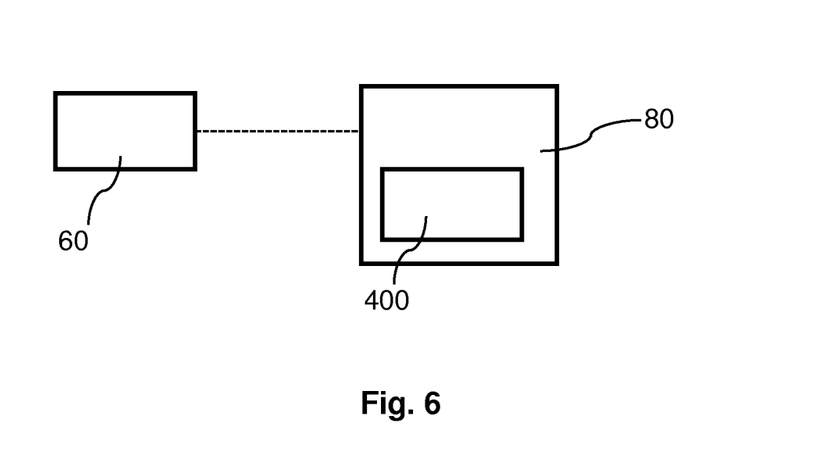
FIG. 6 shows a principal sketch of parts of a first communication system

FIG. 6 shows a principal sketch of parts of a first communication system interacting with a mobile device 60 comprising an application identification unit 211. Mobile device 60 identifies, allocates and couples the application index to an access request which is transmitted from mobile device 60 to MME 80. MME 80 comprises an application administration unit 400. The application administration unit 400 is adapted to assign the application index to the access request using the coupling between the access request and the application index. The application administration unit 400 may be further adapted to manage network resources based on the assigned application index. Applications may, for example, be prioritized or blocked by means of the assigned application index.

Figure 7:
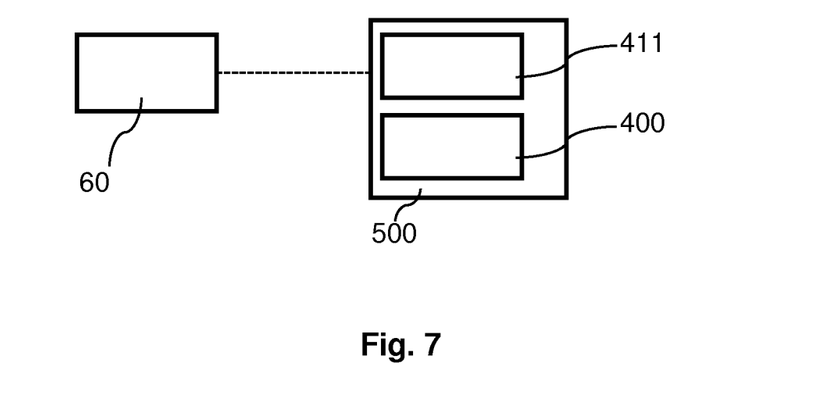
FIG. 7 shows a principal sketch of parts of a second communication system

FIG. 7 shows a principal sketch of parts of a second communication system interacting with a mobile device 60 comprising an application identification unit 211. Mobile device 60 identifies, allocates and couples the application index to an access request which is transmitted from mobile device 60 to MME 80. MME 80 comprises an application administration unit 400 and another application identification unit 411. Application identification unit 411 of MME 80 is adapted identify, allocate and couple an application index to an access request which is transmitted from a mobile device without application identification unit 211. Application identification unit 411 of MME 80 is further adapted to check whether a correct application index was coupled to an access request by means of mobile device 60 comprising an application identification unit 211. The application administration unit 400 is adapted to assign the application index to the access request using the coupling between the access request and the application index. The application administration unit 400 may be further adapted to manage network resources based on the assigned application index. Applications may, for example, be prioritized or blocked by means of the assigned application index.

Figure 8:
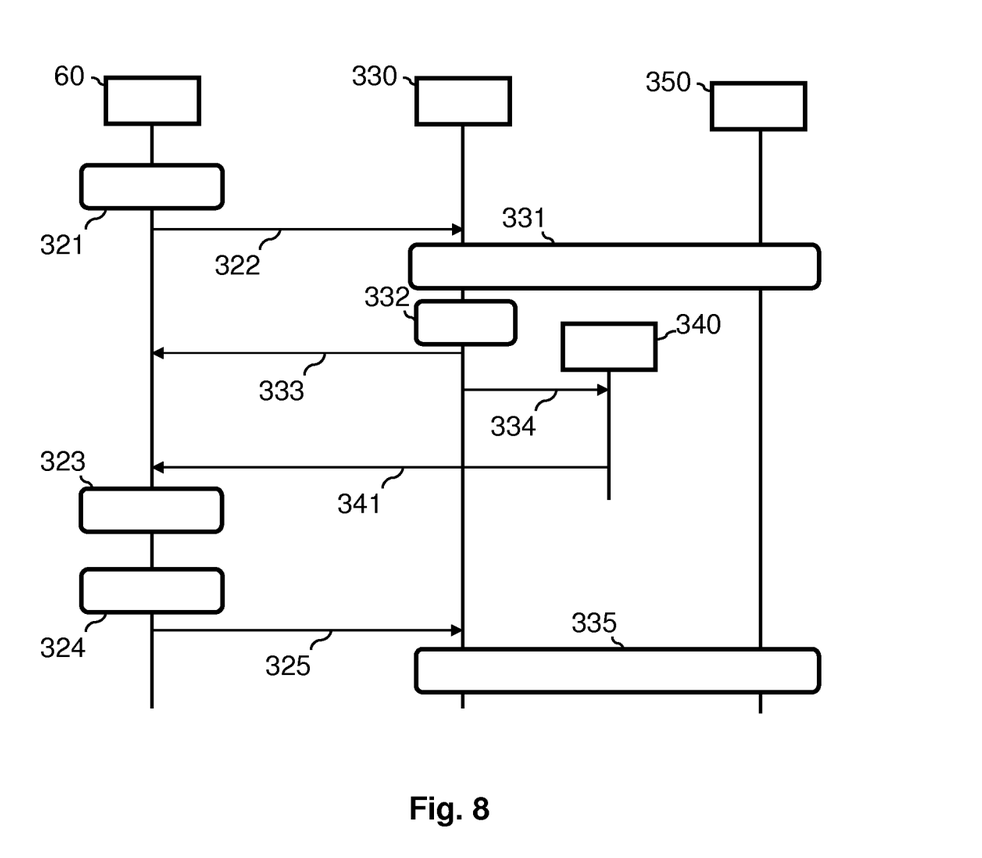
FIG. 8 shows a principal sketch of implementations of the method in a mobile communication network In the Figures, like numbers refer to like objects throughout. Objects in the Figures are not necessarily drawn to scale.

FIG. 8 shows a principal sketch of implementations of the method in a mobile communication network. Mobile device 60 initiates in step 321 an initial attach or tracking area update to the core network. A corresponding attaching or tracking area updating request is submitted in step 322 to MME/PGW 330 which initiates in step 331 a query in Home Subscriber Server (HSS) 350. HSS 350 indicates whether or not the application-based-traffic handling applies to the user (subscriber to a network provider) of mobile device 60. The indication is "Yes" in step 332 such that according to a first alternative in step 333, which may be used for changing purposes, an attaching or tracking area updating accept message is send from MME/PGW 330 to mobile device 60. MME/PGW 330 adds a list containing the allocation of application indices and the corresponding applications to this message. The NAS of mobile device 60 stores the list in step 323 which was received in step 333 such that the application identification unit 211 of mobile device 60 can access the list in order to identify, allocate and couple an application index to an access request of an application started by the user of mobile device 60.

Alternatively or in addition MME/PGW 330 informs an application management server 340 in step 334 and the application management server 340 sends the list containing the allocation of application indices and the corresponding applications in step 341. An application management unit of mobile device 60 may store the list in step 324 which was received in step 341. The list is sent to the NAS layer when an application is started such that the application identification unit 211 of mobile device can access the list in order to identify, allocate and couple an application index to an access request of an application started by the user of mobile device 60.

In both alternatives in step 325 an extended service request, bearer resource allocation request or bearer resource comprising the application index of the respective application in a new information element is finally sent from mobile device 60 to MME/PGW 330. The MME/PGW 330 is application aware and can manage and allocate bearer resources for request 325 based on the received application index. MME/PGW 330 may, for example, pre-empt resources used by an application with lower priority, suspend an application with lower priority, reject the request or free resources by offloading certain applications to WLAN access if available etc. After the bearer resources are successfully allocated to mobile device 60, MME/PGW 330 map and store an application subclass to the used bearer. MME/PGW 330 thus know about the actually used Application Index which is associated to the allocated bearer to carry on the application. With this knowledge and its corresponding priority, the MME/PGW 330 can handle the future bearer requests appropriately (for instance, to execute a pre-emption to satisfy the new request or to reject the request) if the network gets congested.

It's a basic idea of the present invention to couple an application index in a flexible way to an application running on a mobile device 60. The application index enables management of network resources, for example, by means of MME 80 especially within one bearer used for data exchange for the respective application. It's thus possible to categorize applications requiring the same QoS and thus accessing the same bearer especially the default bearer 150 in accordance with network resources which are on average required to run the respective application. Applications can thus be blocked or prioritized depending on network traffic or in accordance with agreements with subscribers (user of mobile devices 60) and/or service providers operating the applications running on mobile device 60.

While the invention has been illustrated and described in detail in the drawings and the foregoing description, such illustration and description are to be considered illustrative or exemplary and not restrictive.

From reading the present disclosure, other modifications will be apparent to persons skilled in the art. Such modifications may involve other features which are already known in the art and which may be used instead of or in addition to features already described herein.

Variations to the disclosed embodiments can be understood and effected by those skilled in the art, from a study of the drawings, the disclosure and the appended claims. In the claims, the word "comprising" does not exclude other elements or steps, and the indefinite article "a" or "an" does not exclude a plurality of elements or steps. The mere fact that certain measures are recited in mutually different dependent claims does not indicate that a combination of these measures cannot be used to advantage. Any reference signs in the claims should not be construed as limiting the scope thereof.

LIST OF REFERENCE NUMERALS 10 step of activating an application
15 step of identifying the application
20 step of allocating application index
25 step of coupling application index to access request
30 step of submitting access request and coupled application index
35 step of assigning application index to access request
40 step of managing network resources
50 signaling plane
52 Non Access Stratum (NAS)
60 mobile device
61 Applications
62 ESM/EMM
63 Radio/L2
64 Radio/L1
70 eNB
71 eNB Service
72 Radio/L2
73 Radio/L1
74 S1AP/SCTP
75 IP/L2/L1
80 MME
81 Applications
82 ESM/EMM
83 S1AP/SCTP
84 IP/L2/L1
100 user plane
125, 125a APP#1 . . . APP#N
126 PDCP
127 Radio/L2/L1
136 PDCP
137 Radio/L2/L1
138 GTP-U/UDP
139 IP/L2/L1
140 S/PGW
146 GTP-U/UDP
147 IP/L2/L1
150 default bearer
211, 411 application identification unit
213 memory unit
215 security module
216 acoustic unit
217 computing unit
218 display unit 321 performing initial attach or tracking area update to network
322 attaching or tracking area updating request
323 storing list of applications received from MME/PGW
324 storing list of applications received from Application Management Server
325 Extended access request
330 Management Mobility Entity/PDN Gateway (MME/PGW)
331 query Home Subscriber Server (HSS)
332 application based traffic applies
333 attaching or tracking area updating accept
334 Application Management Server informed
335 MME/PGW application aware
340 Application Management Server
341 Application Management Server sends list with application indices
350 HSS
400 application administration unit
500 network component

The invention claimed is:

1. A method of administrating an application within a bearer of a mobile communication network, the method comprising the steps of:
Activating by means of a mobile device an application requiring access to the mobile communication network;
Identifying the application by means of an application identification unit;
Allocating an application index to the application by means of the application identification unit based on the identification of the application;
Coupling the application index to an access request related to the application by means of the application identification unit such that managing of network resources based on the coupled application index is enabled;
Submitting the access request and the coupled application index to an application administration unit;
Assigning the application index to the access request by means of the application administration unit; and
Managing the network resources related to the bearer based on the received application index assigned to the activated application by assigning a priority to the access request based on the assigned application index.

2. The method according to claim 1, wherein the application identification unit is comprised by the mobile device and the application index is coupled to the access request prior to submitting the access request from the mobile device to the mobile communication network.

3. The method according to claim 1, wherein the application identification unit is comprised by a network component of the mobile communication network and the application index is coupled to the access request after submitting the access request to the communication network.

4. The method according to claim 1 comprising the further steps of:
Analyzing application indices of access requests received within a predetermined time period; and
Determining a network load based on the analysis of the received access requests.

5. The method according to claim 4 comprising the further step of:
Adapting a capacity of the bearer in accordance with the determined network load.

6. The method according to claim 1 wherein the identification of the application is based on an Access Point Name and/or an Internet Protocol Address being related to the application.

7. An application administration unit being adapted to receive an access request being related to an application activated on a mobile device, the access request being arranged to enable access to a bearer between the mobile device and a mobile communication network, and the access request being coupled to an application index, the application administration unit being further adapted to assign the application index to the access request, and the application administration unit being further adapted to manage network resources related to the bearer based on the assigned application index by assigning a priority to the access request based on the assigned application index.

8. A communication system comprising a mobile device comprising an application identification unit, the application identification unit being adapted to identify an activated application, the application identification unit being further adapted to allocate an application index to the application based on the identification of the application, and the application identification unit being further adapted to couple the application index to an access request related to the application, and the communication system further comprising an application administration unit being adapted to receive the access request from the mobile device via a bearer of a mobile communication network, the application administration unit being further adapted to assign the application index to the access request, and the application administration unit being further adapted to manage network resources related to the bearer based on the assigned application index by assigning a priority to the access request based on the assigned application index.

9. The communication system according to claim 8, wherein the communication system is adapted to determine a network load being related to the application, and the communication system being further adapted to adapt the application index based on the determined network load.

10. A communication system a network component of a mobile communication network comprising an application identification unit, the network component being adapted to receive from a mobile device via a bearer of the mobile communication network an access request being related to an application activated on the mobile device, wherein the application identification unit being adapted to identify the application, the application identification unit being further adapted to allocate an application index to the application based on the identification of the application, and the application identification unit being further adapted to couple the application index to the access request, and the communication system further comprising an application administration unit being adapted to receive the access request from the network component, the application administration unit being further adapted to assign the application index to the access request, and the application administration unit being further adapted to manage network resources related to the bearer based on the assigned application index by assigning a priority to the access request based on the assigned application index.

* * * * *